United States Patent [19]

Kirkpatrick

[11] Patent Number: 5,068,832
[45] Date of Patent: Nov. 26, 1991

[54] BINAURAL ULTRASOUND DETECTOR AND IMAGER

[75] Inventor: Thomas I. Kirkpatrick, La Jolla, Calif.

[73] Assignee: The United States of America as represented by the Secretary of the Navy, Washington, D.C.

[21] Appl. No.: 481,421

[22] Filed: Feb. 15, 1990

[51] Int. Cl.⁵ ............................................. G01S 15/00
[52] U.S. Cl. ..................................................... 367/97
[58] Field of Search .................. 367/97; 342/100, 102, 342/103; 331/1 R, 18, 25

[56] References Cited

U.S. PATENT DOCUMENTS 4,290,127  9/1981  Pridham et al. ..................... 367/123
4,324,142  4/1982  Auphan et al. ........................ 73/626
4,672,330  6/1987  Floyd et al. .......................... 342/103

Primary Examiner—Daniel T. Pihulic
Attorney, Agent, or Firm—Harvey Fendelman; Thomas Glenn Keough; Peter A. Lipovsky

[57] ABSTRACT

A frequency translator converts inaudible sounds into audible sounds while preserving the phase relationship of the sounds. The translator mixes a local reference frequency with an inaudible receive signal to translate the receive signal to an audible frequency. If the receive signal exceeds a predetermined value, the reference frequency gets shifted in phase to correspond to the phase of the receive signal at that moment. The resulting translated signal is thus in phase with the receive signal at the moment of shift, so that the time-of-arrival of the receive signal is not lost. When used individually in conjunction with left and right listening channels, the translator enables a listener to hear as well as sense the time-of-arrival of otherwise inaudible signals.

21 Claims, 5 Drawing Sheets

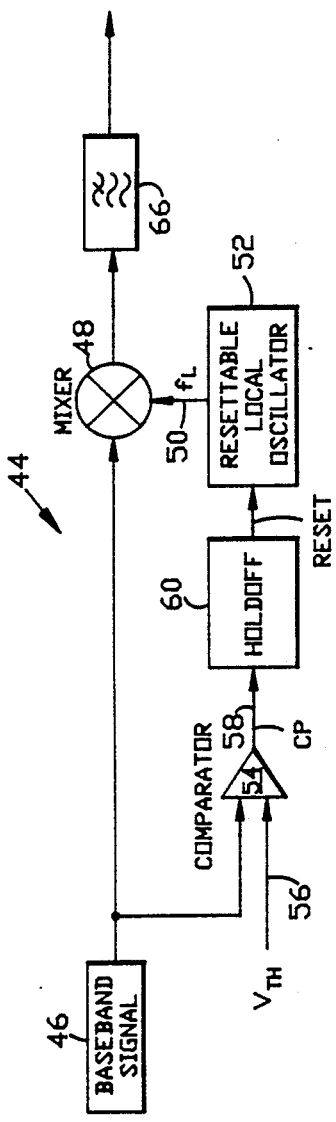
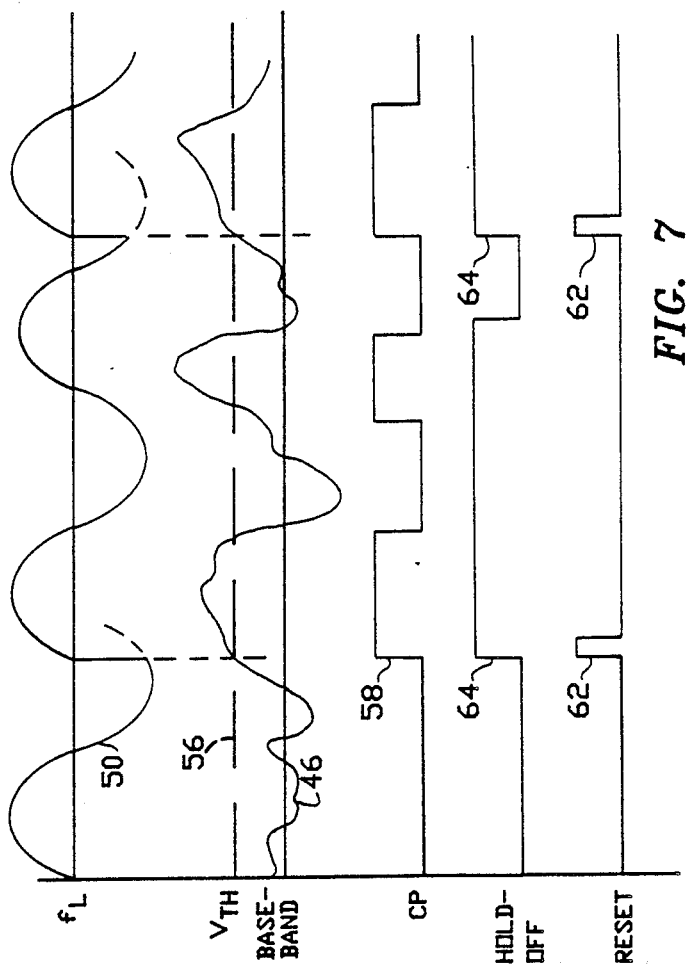
FIG. 6
FIG. 7

BINAURAL ULTRASOUND DETECTOR AND IMAGER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention pertains broadly to the field of acoustic wave systems and devices. More particularly, but without limitation thereto, the invention pertains to a device that converts inaudible sounds of particular phase relationships into audible sounds of substantially the same phase relationships.

2. Description of the Prior Art

In the process of ordinary listening, it is possible not only to detect sounds but also t surmise from where sounds emanate. Sound detection requires only a single receptor while determining the direction of a sound's source requires two or more receptors placed at locations distant from each other.

In the familiar case of human hearing our ears permit us to ascertain the direction from which a sound is emitted. The convolutions of the ear in conjunction with the ear drums serve to tell us upon which ear a sound is more intense. A sound emanating closer to one earwwill not only appear louder to that ear but will impinge upon the closer ear first. In this sense both the intensity as well as the time-of-arrival of the sound will cue a listener as to the direction from which the sound emanates.

Sound within the audible hearing range can be heard outright if the listener is close enough to the sound or can be heard from greater distances if the listener utilizes typical amplification techniques. In order for humans to hear sounds above or below the audible range, however, it is necessary to trans)ate these sounds to a band of frequencies perceivable by the ordinary human ear.

Prior art exists for translating inaudible frequencies into frequencies of the audible sound range. In FIG. 1 there is shown a typical frequency translator 10. Incoming baseband signals 12, such as ultrasonic signals, are mixed in a mixer 14 with a local reference frequency 16 generated by a local oscillator 18.

The resulting output of translator 10 is described graphically in FIG. 2. The mixing or heterodyning process creates sum 20 and difference 22 frequency bands of the 24 original baseband 12 ($f_1$ through $f_2$).

FIGS. 1 and 2 show how a desired translated frequency band can be preserved by utilizing common filtering techniques. In the case of ultrasonics, the audible frequency-downshifted difference-component 22 can be preserved by means such as low pass filter 24. In this instance, filter 24 has a response curve 26 that prevents frequency components outside of the curve from passing to a listener.

In the prior art technique shown in FIG.!, local oscillator 18 free-runs to continuusly generate reference frequency 16. As a consequence, the phase of any translated signals with respect to the phase of the incoming signals is random. This is apparent by viewing FIG. 3 which shows how the local oscillator reference frequency 16 used in this prior art frequenoy translation process can easily be out-of-phase with received baseband signals 12.

The prior art system described works well where only a single channel of signal reception is being processed and where the phase of the translated output signal is of no consequence. To pinpoint the direction from which a sound emanates, however, at least two channels must be used with the phase of the incoming sounds being preserved.

SUMMARY OF THE INVENTION

The present invention uses a local oscillator and mixer to perform frequency translations such as the prior art. The invention is distinguished from the prior art in that the local oscillator of the invention is not allowed to free-run continuously. The oscillator is arranged to be shifted in phase when the amplitude of an incoming signal exceeds a predetermined threshold. Sound amplitude exceeding this predetermined threshold causes a comparator to generate a control pulse which resets the local oscillator to generate in-phase with the incoming baseband signal at that instant.

This resetting action is significant when, for example, right and left channels of ultrasonic signals are translated down to the sonic range so as to become audible to the right and left ears of a human listener. If a free-running local oscillator were used for each of the corresponding channels, random phasing with respect to the left and right signals would cause the relative phase of the translated signals to also be random. The ear of the listener would be confused, making directional localization of sound impossible.

By utilizing a local oscillator for each channel and phase locking the oscillator to the respective left and right signals, correct timing of the translated signals can be preserved. The listener can thus perceive relative time-of-arrival cues and can interpret these cues as to the direction of a sound's source.

The invention works well for impulse type signals, which constitute the bulk of naturally occurring acoustic signals. In the event the invention processes a signal that continuously exceeds the predetermined threshold, the local oscillator of each channel would be reset into a zero-beat with the signal, producing an output at zero Hertz. To avoid this condition, an optional hold-off circuit may be utilized to forestall any oscillator resetting action for a period of time following an initial reset. Translated output from both impulse and continuous wave input can thus be achieved.

OBJECTS OF THE INVENTION

It is an objective of the invention to provide a frequency translator having output signals corresponding in phase to input signals.

Another object of the invention is to provide a frequency translator that translates sound of inaudible frequencies into sound of audible frequencies without altering the phase relationships of the sound.

Still yet another object of the invention to provide a plurality of frequency translated channels in which the phase relationship of signals received upon the channels is preserved during the frequency translation of the signals so that a listener may detect the signals as well as surmise the direction from which the signals are emitted.

Yet another object of the invention is to provide a listener with left and right channels of sound translate from inaudible frequency ranges to the audible frequency range with the phase of the sound being substantially unaltered during the frequency translation so that the listener may hear the translated sound as well as discern the direction from which the sound emanates.

These and other objects, advantages and new features of the invention will become apparent from the following detailed description of the invention when considered in conjunction with the accompanied drawings.

BRIEF DESCRIPTION OF THE DRAWINGS

FIG. 6 is a diagrammatic representation of a frequency translator according to a second embodiment of the invention.

FIG. 7 depicts representative signals as received and produced by the embodiment of the invention as shown in FIG. 6.

DESCRIPTION OF THE PREFERRED EMBODIMENTS

Figure 1:
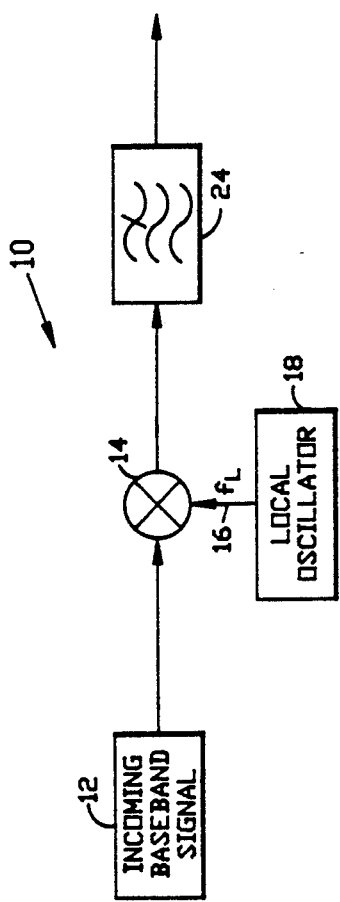
FIG. 1 is a diagrammatic representation of a frequency translator of the prior art.
Figure 2:
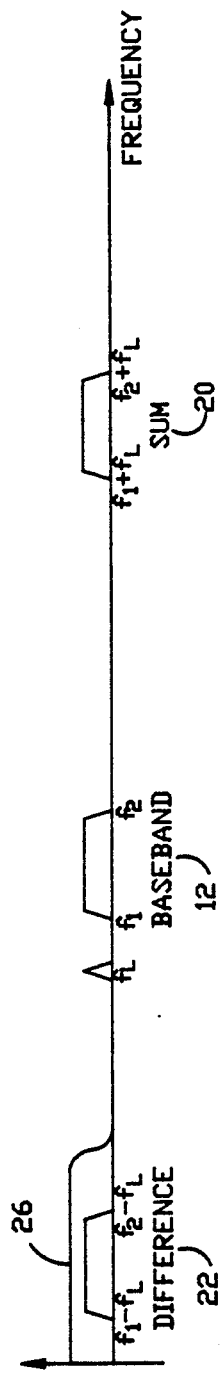
FIG. 2 is a representative output spectrum corresponding to the frequency translator of FIG. 1.
Figure 3:
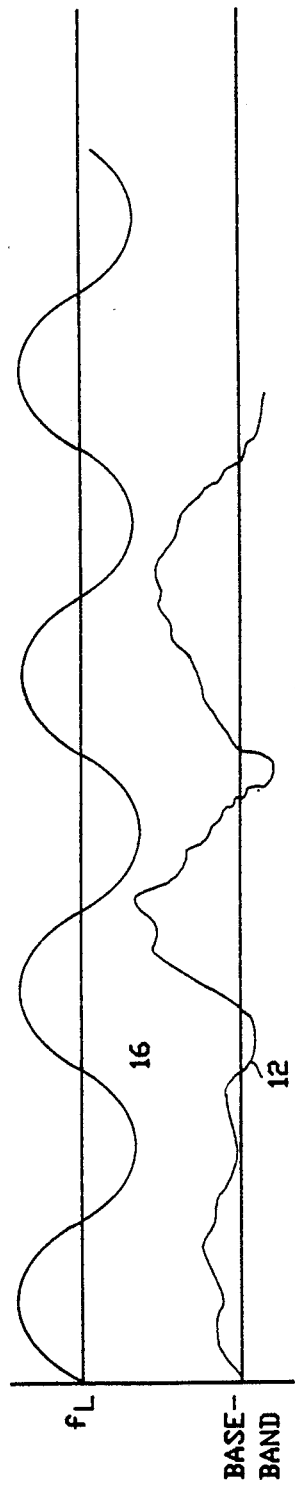
FIG. 3 depicts graphical representations of received and generated signals as may occur with the prior art frequency translator shown in FIG. 1.

As discussed, the prior art frequency translator 10 of FIG. 1 includes free-running local oscillator 18 that generates local frequency 16. The local reference frequency is mixed with incoming baseband signals 12 to produce a desired translated frequency. In FIG. 3, representative receive baseband 12 is shown with representative loca oscillator frequency 16, designated ($f_L$).

As can be seen in FIG. 3, the phase relationship of local oscillator frequency 16 is random in relation to incoming baseband signals 12. The random phasing of the oscillator frequency with respect to the receive baseband signals causes the relative phase of any frequency translated signals to also be random. As such, sound time-of-arrival cues will be lost in this frequency translation process so that a listener will not be able to discern from which direction a received sound emanates.

Figure 4:
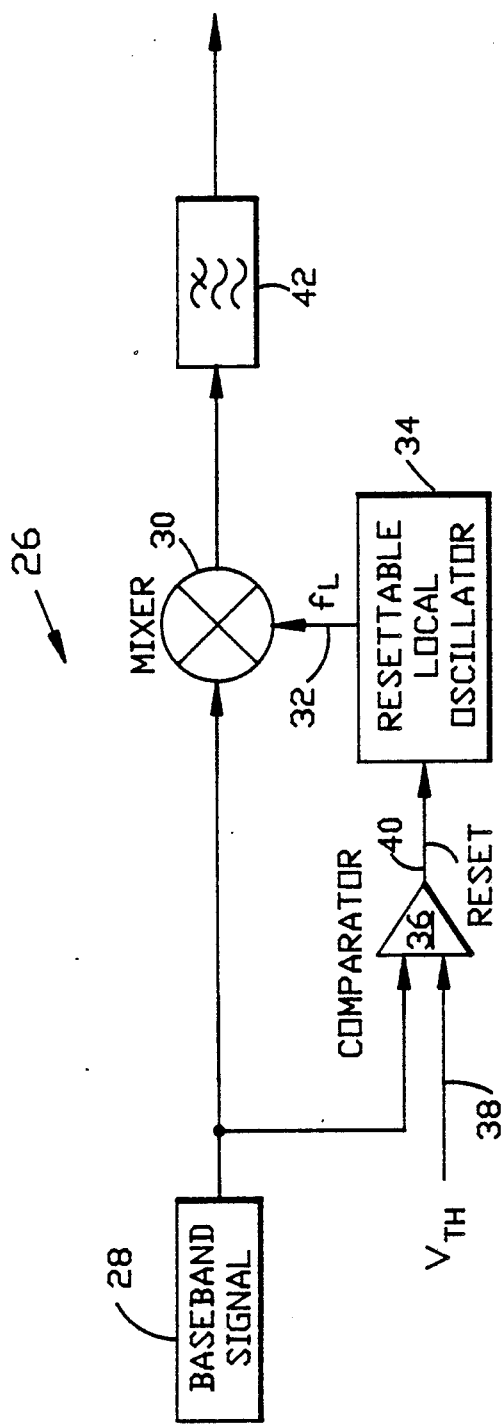
FIG. 4 is a diagrammatic representation of a frequency translator according to one embodiment of the invention.

Referring now to FIG. 4, a frequency translator 26 according to a first embodiment of the invention is shown. Translator 26 preserves time-of-arrival cues present in ambient sound so that if an individual translator 26 is operably coupled to each of the right and left hearing reception channels of a listener, the listener will be able to discern the direction from which a received sound travels.

In FIG. 4, receive baseband signals 28 may, for example, be made up of received ultrasonic impulse and continuous wave inputs. Like in the prior art, these inputs are combined in a mixer 30 with a locally generated oscillator frequency 32. In distinction from the prior art, frequency 32 is generated in a local oscillator 34 that is not allowed to continuously free-run. Oscillator 34 is instead resettable and is arranged to produce an oscillator frequency that is shifted in phase under certain conditions.

Figure 5:
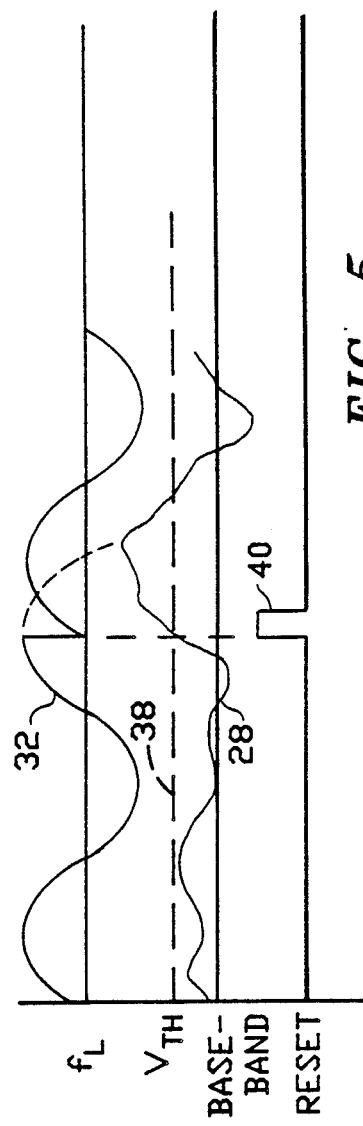
FIG. 5 depicts representative signals as received and produced by the frequency translator of FIG. 4.

This phase shifting takes place whenever the amplitude of an incoming receive baseband signal exceeds a predetermined threshold. The nature of this shifting action can be more easily understood by referring to both FIGS. 4 and 5.

Receive baseband signal 28 is first compared, in a comparator 36, with a predetermined threshold value 38. If the amplitude of the baseband signal exceeds the threshold value, comparator 36 will generate a control pulse 40 that resets local oscillator 34 so that its generated oscillator frequency is in-phase with the incoming baseband signal at that instant.

In operation, threshold value 38 may be set slightly above the ambient background noise level so that any sound above this level causes a resetting action to occur. Any frequency translated sound can, as in the prior art, be filtered to preserve only those frequencies of listening interest. In the case of ultrasonic frequency translation applications, for example, a low-pass filter such as that represented by block 42 could be used.

Frequency translator 26 of FIG. 4 is designed to work well with impulse signals, as these constitute the majority of naturally occurring acoustic signals. In the event signals of substantially continuous frequency are processed, local oscillator 34 would be pulled into a zero-beat if the incoming signals exceeded the preselected threshold value. This would produce a translated output frequency of zero Hertz.

In FIG. 6 an optional second embodiment of the invention can be used to prevent this from occurring. This embodiment will be described generally at first, with more detailed analog and digital versions of this embodiment being described later.

Frequency translator 44 of FIG. 6 includes a receive baseband signal 46 that is mixed in a mixer 48 with a local oscillator frequency 50. Like the first embodiment of the invention, the oscillator frequency is generated by a resettable local oscillator, 52. Also like the first embodiment of the invention, translator 44 includes a comparator 54 that compares baseband signal 46 with a threshold value 56.

When baseband 46 exceeds the threshold value, a comparator control pulse 58, designated as CP, is generated. In this embodiment, the pulse from the comparator is sent to a hold-off element 60, causing a reset pulse 62 to be generated therein and sent to resettable local oscillator 52. The reset pulse causes the oscillator to "phase reset" or to start at a known phase point of origin so that any frequencies translated at that moment will be in phas with the baseband signal received at that instant. This operation is represented graphically in FIG. 7.

In FIG. 7 it can be seen that as baseband signal 46 initially rises above the threshold value 56, comparator signal 58 is generated. Referring to both FIGS. 6 and 7, this signal is initially passed "through" hold-off element 60 to generate reset pulse 62, thereby effectuating a phase reset of oscillator frequency 50.

When receive baseband signals 46 repetitively exceed threshold value 56, comparator 54 will generate equally repetitive comparator pulses 58. To prevent these pulses from continuously resetting local oscillator 52, a hold-off pulse 64 is generated within hold-off element 60. The hold-off pulse occurs upon the generation of the "initial" reset pulse and prevents any new reset pulses from being sent to the local oscillator until the period of the hold-off pulse is timed-out.

Once the hold-off pulse has timed-out, the next value of receive baseband signal 46 exceeding the threshold value will generate a comparator pulse 58 that will now be passed through hold-off element 60 to provide a "new" reset pulse 62 to oscillator 52, thereby resetting the phase of oscillator frequency 50. Simultaneously with the generation of this "new" reset pulse, a "new" hold-off pulse will be generated to prevent further oscillator phase resetting until the newly generated hold-off period has expired.

The hold-off period is chosen to allow several complete cycles of local oscillator 52 to occur before another phase reset of the oscillator is allowed. This assures that a usable translator output will exist for both impulse and substantially continuous baseband signals. This output, like in the first embodiment of the invention, may be filtered such as by filter 66 to block any undesired translated frequencies from reaching a listener.

Figure 8:
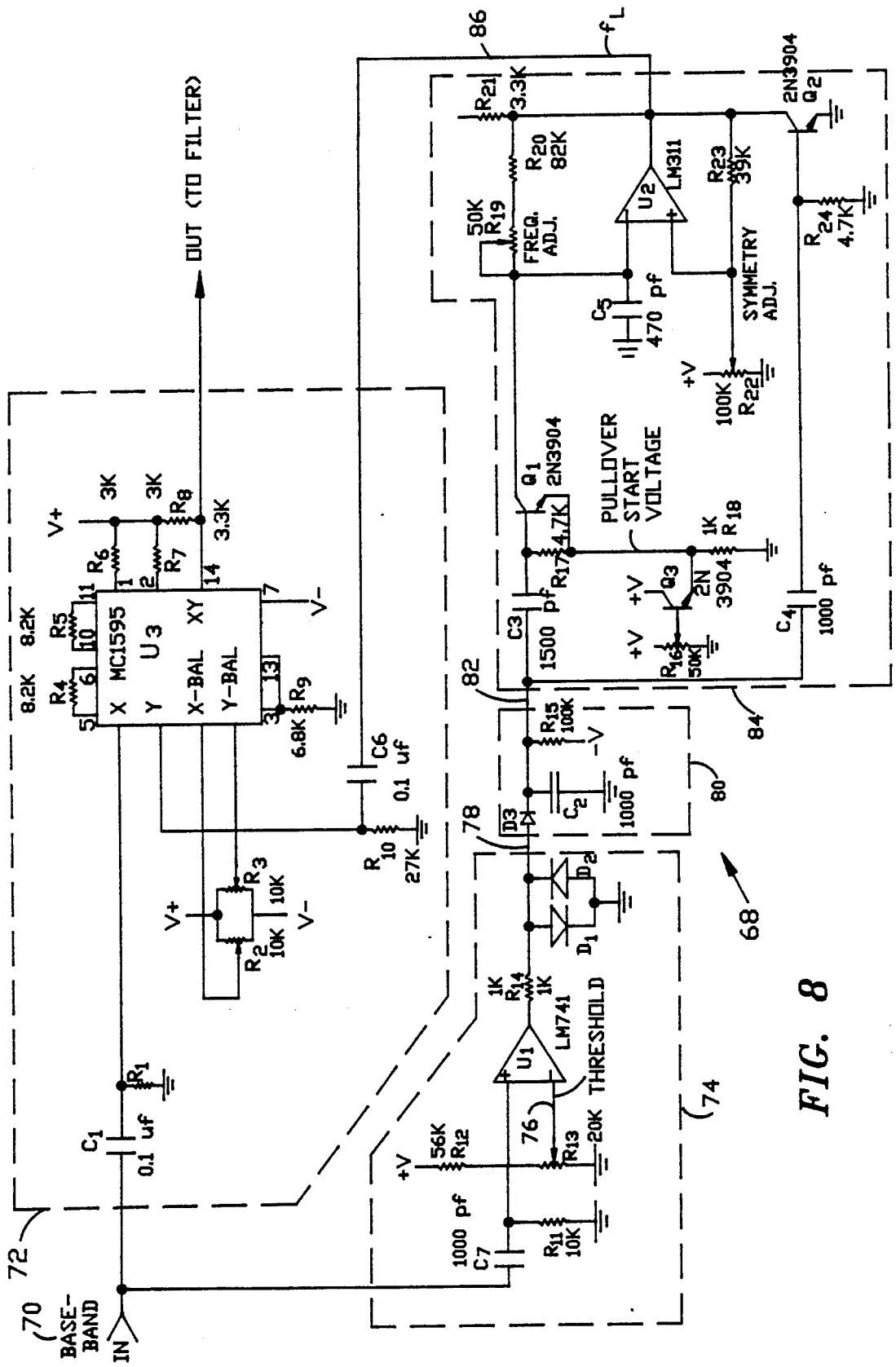
FIG. 8 is a representative schematic of an analog version of the invention depicted in FIG. 6.

In FIG. 8 a schematic of a representative analog version 68 of the invention shown in FIG. 6 is illustrated. Received baseband signals 70, such as ultrasonic signals, are simultaneously passed to a mixer circuit 72 and a comparator circuit 74. Within mixer circuit 72 baseband signals 70 are coupled to mixer element U3 by C1 and R1. Element U3 is a four-quadrant multiplier integrated circuit such as a MC1595 that is used in this application as a balanced mixer. Its XY output produces a signal containing components which are the sum, $X+Y$, and the difference, $X-Y$, of the mixer's X and Y inputs.

In the case of processing baseband signals within the ultrasonic range, for example, the $X-Y$ difference components of mixer U3 would be used to provide a listener with ultrasonic frequencies downconverted to the audible frequency range. If on the other hand it was desired to frequency translate signals of the subsonic range, these could be upconverted to the sonic range through use of the $X+Y$ sum components of the mixer.

Resistors R4 through R9 of mixer U3 are of values chosen according to the integrated circuit manufacturer's data sheet to produce a desired gain and operating point of the circuit. Values that are representative are shown in FIG. 8. Potentiometers R2 and R3 are used to null out undesired residual X and Y signals from the output of element U3.

As discussed, baseband signals 70 are also passed to comparative circuit 74. In this circuit, C7 and R11 couple the signals to comparator element U1, such as a commercially available LM741. Resistors R12 and R13 are used to set a preselected voltage corresponding to the desired aforementioned threshold value, 76. When a signal received at the plus sign input of U1 is more positive than this threshold value, the output of U1 will go positive. Resistor R14 couples this positive transition to diodes D1 and D2 which clamp the swing of this output to, in this representative case, plus or minus 0.7 volts.

This positive-swing comparator pulse 78 is passed from comparator circuit 74 to a hold-off circuit 80. Hold-off circuit 80 may be easily removed from translator 68 if a hold-off reset function is not desired. Diode D3 couples pulse 78 to the hold-off circuit's RC network of C2 and R15, causing, in this representative case, a +1.4 voltage transition to occur at these RC junctions. The time constant of this RC network is chosen so that when the pulse coupled to D3 falls away, a slow voltage decay is experienced. This decay provides a hold-off period that prevents a reset pulse 82 from being sent to resettable oscillator circuit 84 during the course of the hold-off period. The hold-off period prevents oscillator circuit 84 from undergoing rapid resetting such as would occur when a substantially continuous wave input exceeding the threshold value is received by frequency translator 68.

Local oscillator circuit 84 is formed from a comparator integrated circuit U2, such as a commercially available LM311, connected in a feedback configuration to become a free-running multivibrator.

Resistors R19 through R21 together with capacitor C5 are used to set oscillator frequency 86 also shown as $f_L$. Oscillator frequency 86 is chosen to be rapid enough to provide sufficient accuracy in the frequency translation process. In the case in which frequency translator 68 is used to process baseband signals within the ultrasonic range, for example, it was found that an oscillator frequency of 15,000 cycles per second performed satisfactorily.

Within oscillator circuit 84, resistors R22 and R23 are used to adjust the symmetry of oscillator frequency 86 so as to produce square waves, for example, of the local oscillator frequency. These waves are coupled to mixer U3 of mixer circuit 72 through C6 and R10 of this circuit.

Multivibrator U2 of oscillator circuit 84 runs continuously at frequency $f_L$ provided that the receive baseband signals are not large enough to exceed threshold value 76 at comparator element U1.

When the received baseband signals are large enough to exceed the threshold value at U1, a positive transition will occur at C2/R15 of hold-off element 80, providing that these RC elements are not currently engaged in timing out a hold-off period. When such a positive transition occurs, multivibrator U2 is interrupted in its steady state oscillation. The oscillation cycle of the multivibrator is reset to a known phase state and then is allowed to immediately resume stable oscillation. The reset permits this known phase relationship to coincide with the phase of the baseband signal received at the instant of reset. Transistors Q1 through Q3 of element 84, such as commercially available 2N3904s, are used to accomplish this action.

When a positive transition occurs at C2/R15, C4 couples the transition to transistor Q2 causing Q2 to saturate and to pull the output of multivibrator U2 to ground. Simultaneously therewith, C3 couples this positive transition to the base of transistor Q1. The emitter of transistor Q1 is set to a preselected voltage, which may be termed the "pullover start voltage", by resistor R16 and voltage-follower transistor Q3. This pull-over start voltage is set to allow U2 to produce exactly the same pulse width during the first cycle of the multivibrator, following reset, as in all succeeding cycles of the multivibrator.

In the particular embodiment of the invention shown, transistor Q1 saturates when the base voltaqe of Q1 exceeds the pullover start voltage by 0.7 volts. The voltage at C5 is thereby forced to assume a known value equal to the pull-over start voltage plus the saturation drop of transistor Q1. Resistor R16 is adjusted to make this known value correspond to the voltage existing at the lowest point in the free-running cycle of multivibrator Q2. Thus, when the positive transition coupled through C3 and C4 goes away, Q1 and Q2 turn off and allow multivibrator U2 to start a new oscillatory cycle in exactly the same state as though the multivibrator had gotten there by free-running.

Figure 9:
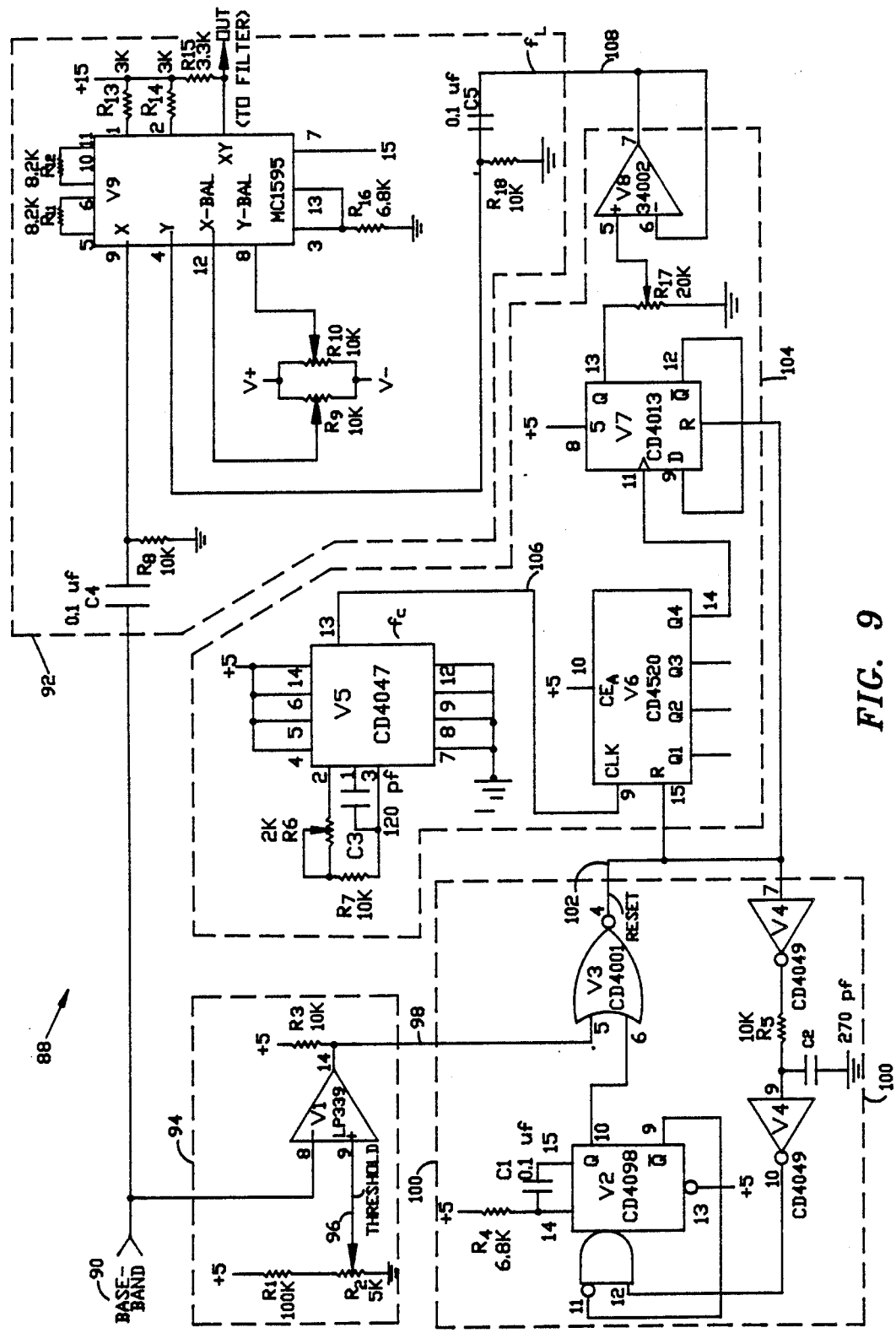
FIG. 9 is a representative schematic of a digital version of the invention depicted in FIG. 6.

Referring now to FIG. 9 a representative digital version 88 of the embodiment of the invention shown in FIG. 6 is illustrated. Like the analog version of the invention shown in FIG. 8, frequency translator 88 includes a hold-off circuit, to be described, to permit resetting of the translator's local oscillator. As with translator 68 of FIG. 8, this hold-off component may be easily removed when not wanted.

Turning now to the greater details of translator 88, it can be seen that received baseband signals 90, such as ultrasonic signals for example, are passed to a mixer circuit 92 where they are coupled through capacitor C4 and R8 to mixer element V9. Element V9 is a four-quadrant multiplier integrated circuit used in this instance as a balanced mixer. The XY output of V9 produces a signal containing signal components which are the sum, $X+Y$, and the difference, $X-Y$, of the signals at the mixer's X and Y input.

In instances where down conversion of the baseband signals is desired, such as converting ultrasonic frequencies into audible frequencies, the difference components $X-Y$ of mixer V9 would be chosen. In contradistinction, if up conversion of received baseband signals is desired, the $X+Y$ sum components of mixer V9 would be used.

Component V9 may be, for example, a commercially available MC1595 integrated circuit (IC). Resistors R11 through R16 of this component are ohosen aooordinq to the component manufacturer's data sheet to produce the desired gain and operating point of the circuit. Values which may be used in this application are offered by way of example in FIG. 9. Potentiometers R9 and R10 are used to null out residual X and Y signals from the output of V9.

Received baseband signal 90 also drives a comparator circuit 94 including a comparator element V1 such as an LP339. Resistors R1 and R2 set a threshold voltage value 96 of comparator V1. When the signal at the minus input of V1 becomes more positive than the set threshold voltage, the output of V1 goes negative. This negative signal or comparator pulse 98 is passed to a hold-off circuit 100.

Assuming that the hold-off circuit is not presently engaged in timing-out a hold-off period, as will be further described, the negative comparator pulse 98 will cause the output of NOR gate V3 of the circuit to go positive. NOR gate V3 may, for example, be a commercially available CD4001. The generated positive reset pulse 102 initiates a phase shifting operation to take place within translator 88's oscillator 104 as will be described.

Free-running resettable local oscillator 104 is formed by integrated circuits V5 through V8. Element V5 is connected per its manufacturer's data sheet to function as a free-running clock. A CD 4047 connected as shown in FIG. 9, for example, may be used for this purpose. The timing components of V5 are R6, R7 and C3. These RC components are chosen to produce a clock frequency "$f_c$". (106) that determines the accuracy of the resetting capability of frequency translator 88 and that may be varied according to the desired local oscillator frequency to be generated.

For example, for baseband signals within the ultrasonic range, $f_c$ was chosen to be 32 times the generated local oscillator frequency of approximately 15,000 Hertz. In this instance integrated circuit V6, such as a commercially available CD 4520, is used as a divide-by-sixteen counter by taking the Q4 output of this IC.

The Q4 output of V6 is used to toggle V7, which is a D-type flip-flop tied back onto itself so as to divide by two. A commercially available chip suitable for this purpose has the designation CD4013. The Q output of V7 is buffered by unity-gain amplifier V8 to generate local oscillator frequency 108, also labeled as $f_L$. Amplifier V8 may, for example, be a 34002 integrated circuit.

The phase resetting action of oscillator 104 uses a positive transition on V3 to reset V6 and V7 to zero. Since the output of V3 is a short pulse, it goes away quickly enough so that V6 can start counting from zero on the very next pulse edge from clock V5. Any timing uncertainties are nonconsequential as the human ear would be unable to discern these.

In hold-off circuit 100, the hold-off function is performed by retriggerable single-shot V2, such as a CD 4098 and by the two sections of invertor V4, such as CD 4049s. The Q output of V2 is normally low, which conditions V3 to respond to comparator signal 98. When the output of V3 is high, the transition within V2 from low to high is delayed by the combination of the V4s and R5/C2, with the transition then being applied to the positive trigger input of V2. This fires the single-shot V2 and causes its Q output to go high. Immediately thereafter the output of V3 goes low again. The delay around this loop defines the width of reset pulse 102 which only needs to be long enough to reset V6 and V7.

Timing components R4 and C1 of circuit 100 are chosen to provide the desired hold-off period. Until retriggerable single-shot V2 times out, the Q output deconditions V3 so that V3 cannot respond to further comparator signals thereby preventing any reset of oscillator 104 from occurring.

Obviously, many modifications and variations of the invention are possible in light of the above teachings. It is therefore to be understood that within the scope of the appended claim the invention may be practiced otherwise than has been specifically described.

What is claimed is:

1. An apparatus comprising:
   generating means for generating a fixed frequency reference signal;
   mixing means for mixing said fixed frequency reference signal with a receive signal to translate said receive signal into a translated signal different from said receive signal; and
   phase shifting means for shifting the phase of said fixed frequency reference signal to correspond to the phase of said receive signal so that said translated signal is in phase with said receive signal when said fixed frequency reference signal is shifted.

2. An apparatus according to claim 1 in which said fixed frequency reference signal is shifted in phase when said receive signal exceeds a preselected value.

3. An apparatus comprising:
   generating means for generating a reference signal;
   mixing means for mixing said reference signal with a receive signal to translate said receive signal into a translated signal different from said receive signal;
   phase shifting means for shifting the phase of said reference signal to correspond to the phase of said receive signal, said reference signal being shifted in phase when said receive signal exceeds a preselected value, said translated signal being in phase with said receive signal when said reference signal is shifted; and means for preventing the shifting of phase of said reference signal for a preselected period following an initial shift in phase of said reference signal.

4. An apparatus according to claim 1 further including:
means for filtering said translated signal.

5. An apparatus according to claim 1 in which said generating means includes a local oscillator.

6. An apparatus comprising:
generating means including a local oscillator for generating a reference signal;
mixing means for mixing said reference signal with an inaudible receive signal to translate said inaudible receive signal into an audible translated signal; and
phase shifting means for shifting the phase of said reference signal to correspond to the phase of said inaudible receive signal so that said audible translated signal is in phase with said inaudible receive signal when said reference signal is shifted.

7. An apparatus according to claim 6 in which said inaudible receive signal is of an ultrasonic frequency.

8. An apparatus according to claim 5 in which said phase shifting means includes:
a comparator coupled to said local oscillator and having an input for receiving said receive signal, said comparator for providing a control signal to said local oscillator when said receive signal exceeds a preselected value so that said fixed frequency reference frequency is shifted to a preselected phase.

9. An apparatus comprising:
generating means including a local oscillator for generating a reference signal;
mixing means for mixing said reference signal with a receive signal to translate said receive signal into a translated signal different from said receive signal; and
phase shifting means for shifting the phase of said reference signal to correspond to the phase of said receive signal so that said translated signal is in phase with said receive signal when said reference signal is shifted, said phase shifting means including a comparator coupled to said local oscillator and having an input for receiving said receive signal, said comparator for providing a control signal to said local oscillator when said receive signal exceeds a preselected value so that said reference frequency is shifted to a preselected phase; and
a hold-off circuit coupled between said comparator and said local oscillator for preventing said shifting of phase of said reference signal for a preselected period following the generation of said control signal.

10. An apparatus, one said apparatus being operably coupled to a right reception channel and a second said apparatus being operably coupled to a left reception channel, said apparatus comprising:
generating means for generating a reference signal;
mixing means for mixing said reference signal with a receive signal to translate said receive signal into a translated signal different from said receive signal; and
phase shifting means for shifting the phase of said reference signal to correspond to the phase of said receive signal so that said translated signal is in phase with said receive signal when said reference signal is shifted.

11. An apparatus for translating the frequency of a receive signal comprising:
a local oscillator for generating a fixed frequency reference signal;
a mixer operably coupled to said local oscillator for mixing said receive signal with said fixed frequency reference signal to translate said receive signal into a translated signal different in frequency from said receive signal; and
a comparator operably coupled to said local oscillator and having an input for receiving said receive signal, said comparator for providing a control signal to said local oscillator when said receive signal exceeds a preselected value to shift said fixed frequency reference signal to a preselected phase corresponding to the phase of said receive signal, said translated signal being in phase with said receive signal when said fixed frequency reference signal is shifted.

12. An apparatus for translating the frequency of an inaudible receive signal comprising:
a local oscillator for generating a reference signal;
a mixer operably coupled to said local oscillator for mixing said inaudible receive signal with said reference signal to translate said inaudible receive signal into an audible translated signal different in frequency from said inaudible receive signal; and
a comparator operably coupled to said local oscillator and having an input for receiving said inaudible receive signal, said comparator for providing a control signal to said local oscillator when said inaudible receive signal exceeds a preselected value to shift said reference signal to a preselected phase corresponding to the phase of said inaudible receive signal, said audible translated signal being in phase with said inaudible received signal when said reference signal is shifted.

13. An apparatus according to claim 12 in which said inaudible signal is of an ultrasonic frequency.

14. A method for translating a receive signal the steps of:
receiving said receive signal;
generating a fixed frequency reference signal;
mixing said receive signal with said fixed frequency reference signal to translate said receive signal into a translated signal different from said receive signal; and
shifting the phase of said fixed frequency reference signal so that the phase of said translated signal corresponds to the phase of said receive signal when said fixed frequency reference signal is shifted.

15. A method as described in claim 14 in which the steps of shifting includes:
comparing said receive signal with a preselected value; and
shifting the phase of said fixed frequency reference signal when said receive signal exceeds said preselected value.

16. A method for translating an inaudible receive signal comprising the steps of:
receiving said inaudible receive signal;
generating a reference signal;
mixing said inaudible receive signal with said reference signal to translate said inaudible receive signal into an audible translated signal;

comparing said inaudible received signal with a preselected value; and shifting the phase of said reference signal when said inaudible receive signal exceeds said preselected value, the phase of said reference signal being shifted to that the phase of said audible translated signal coresponds to the phase of said inaudible receive signal when said reference signal is shifted.

17. A method for translating a receive signal comprising the steps of:

receiving said receive signal;

generating a reference signal;

mixing said receive signal with said reference signal to translate said receive signal into a translated signal different from said receive signal;

comparing said receive signal with a preselected value;

shifting the phase of said reference signal when said receive signal exceeds said preselected value so that th ephase of said translated signal corresponds to the phase of said receive signal when said reference signal is shifted; and preventing a shift in phase of said reference signal for a preselected period following an initial shift in phase of said reference signal.

18. A method as described in claim 17 in which said receive signal is an inaudible signal and in which said translated signal is an audible signal.

19. A method for translating a receive signal comprising the steps of:

receiving said receive signal;

generating a reference signal;

mixing said receive signal with said reference signal to translate said receive signal into a translated signal different from said receive signal; and shifting the phase of said reference signal so that the phase of said translated signal corresponds to the phase of said receive signal when said reference signal is shifted.

in which said steps of receiving, generating, mixing and shifting are used separately on receive signals of a right reception channel and on receive signals of a left reception channel.

20. A frequency translator, one said frequency translator for use with each of a listener's right and left reception channels, said frequency translator comprising:

a local oscillator for generating a reference frequency;

a mixer coupled to said local oscillator for receivign said reference frequency and for receiving an inaudible frequency, said mixer for mixing said reference frequency with said inaudible frequency to translate said inaudible frequency into a translated audible frequency; and a comparator coupled to said local oscillator for comparing said inaudible frequency with a preselected value and for providing a control signal to said local oscillator to phase shift said reference frequency when said inaudible frequency exceeds said preselected value so that the phase of said translated audible frequency corresponds to the phase of said inaudible frequency at the moment of phase shift.

21. An apparatus according to claim 20 further including:

a hold-off circuit coupled between said comparator and said local oscilaltor for preventing said shifting of phase of said reference signal for a preselected period following the generation of said control signal.

* * * * *